United States Patent [19]

Dozzi

[11] Patent Number: 4,663,380
[45] Date of Patent: May 5, 1987

[54] SELF-EXTINGUISHING POLYCARBONATE COMPOSITION

[75] Inventor: Giovanni Dozzi, Milan, Italy

[73] Assignee: Enichem Polimeri S.p.A., Sassari, Italy

[21] Appl. No.: 770,962

[22] Filed: Aug. 30, 1985

[30] Foreign Application Priority Data

Sep. 4, 1984 [IT] Italy .............................. 22516 A/84
Sep. 4, 1984 [IT] Italy .............................. 22517 A/84

[51] Int. Cl.$^4$ ........................... C08K 3/28; C08K 3/30
[52] U.S. Cl. ................................... 524/419; 524/401; 524/418; 524/428; 524/429; 524/435; 524/436
[58] Field of Search .............. 524/401, 418, 419, 428, 524/429, 435, 436

[56] References Cited

U.S. PATENT DOCUMENTS

| | | | |
|---|---|---|---|
| 3,475,372 | 10/1969 | Gable | 524/611 |
| 3,822,234 | 7/1974 | McRowe | 524/567 |
| 4,028,297 | 6/1977 | Webb | 524/611 |
| 4,113,695 | 9/1978 | Mark | 524/436 |
| 4,223,100 | 9/1980 | Reinert | 524/411 |

FOREIGN PATENT DOCUMENTS 2149311  4/1973  Fed. Rep. of Germany .

OTHER PUBLICATIONS

J. D. Birchall–Combustion & Flame 14, 85–96, (1970).

Primary Examiner—Veronica P. Hoke

[57] ABSTRACT

Self-extinguishing polycarbonates essentially consisting of mixtures of polycarbonates with at least one salt of metals of the I and/or of the II A and B Groups of the Elements Periodic Table, of particular inorganic compounds, and possibly with at least one halogenated organic compound.

7 Claims, No Drawings

SELF-EXTINGUISHING POLYCARBONATE COMPOSITION

From the technical literature, several method are known for rendering self-extinguishing the polycarbonates. Many of these have however shown themselves to be unsatisfactory, in that they impair the other characteristics of the polymer.

The self-extinguishability of the carbonates may be improved e.g. by using as additives at relatively high levels halogenated organic compounds either in synergism with antimony oxide or not (J. T. Howarth et al., Plastic World, pages 64–74, March 1973). It has been found however that the use of such additives causes an excessive degradation of polycarbonates during the processing operations (U.S. Pat. No. 3,334,154), causing in its turn the dedecrease of the typical basic characteristics of the polymer (U.S. Pat. No. 4,153,595).

The use has also been proposed of tetrahalogenated-derivatives of bisphenol A as comonomers in the copolymerization with bisphenol A to yield a polycarbonate supplying either by itself, or blended with a not halogenated polycarbonate, materials provided with a better flame resistance.

It has been reported in that case too that in order to achieve a good flame resistance, such polymeric materials must contain quite high amounts of halogen (U.S. Pat. No. 4,046,836; U.S. Pat. No. 3,775,367; U.S. Pat. No. 4,100,130) and this involves:
 (i) a notable decay in processing performance, so that the mechanical characteristics do not reach the typical level of not-halogenated polycarbonate;
 (ii) development of hydrogen or of hydrogen halide under the normal forming conditions, causing corrosion in the machinery;
 (iii) the development under the combustion conditions of substantial amounts of halogenated breakdown products and, in particular, of hydrogen halides, which can cause further corrosion damages to the metal structures.

The most recent findings are known as well, according to which the self-extinguishability of polycarbonates is improved by the addition of small amounts of particular organic compounds, such as the alkaline or alkaline-earth salts of aryl- or alkyl-sulphonic acids and derivatives thereof (e.g., U.S. Pat. No. 3,940,366; U.S. Pat. No. 3,933,734; U.S. Pat. No. 4,104,253; U.S. Pat. No. 4,153,195; U.S. Pat. No. 4,214,062).

In copending applications in USA Ser. No. 500.861 filed on June 3, 1983 and Ser. No. 524.788 filed on Aug. 19, 1983, we have reported that salts of the metals of Groups IA, IB, IIA, IIB of the Periodic Table of the Elements and of ammonium, of particular carboxylic compounds or of mixtures thereof, improve the self-extinguishability of polycarbonates without impairing their thermal stability under the conditions of forming and of use, as well as the other typical properties of these polymers.

We have also reported that the use in combination with salts of carboxylic organic compounds, of one or more auxiliary agents selected among organic and/or inorganic compounds, provides a further improving of the self-extinguishability of the polycarbonates.

We have now found that salts of the metals of the I and/or II A and B Groups of the Periodic Table of the Elements of particular inorganic compounds, used either alone or as mixtures with each other, and possibly in combination with an auxiliary agent, improve the self-extinguishability of polycarbonates to a notable extent, even if they are used in a very low amount, up to to the highest levels as provided by the UL-94 Standard issued by "Underwriters Laboratories" in the UL-94 Bulletin, rating the polymeric materials as V-0, V-1, V-2, according to their behaviour, as it shall be specified hereinunder.

These salts have the general formulae: $M(X)_n$, $(XSO_3)_nM$, $M(XO_3)_n$, $M(NO_3)_n$, $M(CNO)_n$, $M(SCN)_n$, $M[Fe(CN_6)]_n$, X being a halogen, and M being a metal of the I and/or II A and B Groups of the Periodic Table of the Elements, and n being 2. Preferred forms of such salts are: potassium bromide, potassium fluorosulphonate, potassium chlorosulphonate, calcium chlorosulphonate, zinc chlorosulphonate, potassium bromate, sodium bromate, potassium iodate, potassium nitrate, sodium nitrate, potassium cyanate, potassium thiocyanate, sodium thiocyanate, potassium ferrocyanide.

The auxiliary agents are constituted by halogenated organic compounds selected from:
 (i) the oligomeric or polymeric halogenated ethers;
 (ii) the oligomers from phosgene and tetrahalogenated bisphenol A with phenyl end groups and/or the esters of tetrahalogenated bisphenol A with carboxyl organic acids;
 (iii) halogenated polyethylene;
 (iv) halogenated imides.

Preferred forms of the auxiliary agents are: octabromodiphenyloxide, decabromodiphenyloxide, 1,2-bis-(2,4,6,tribromophenoxy)-ethane, tetrabromobisphenol A bis-(2,3-dibromopropyl ether), brominated polyphenyleneoxide (Br=about 67%), oligomer (n=3–6) from phosgene and tetrabromobisphenol A containing phenyl end groups, tetrabromobisphenol A bis-(2-hydroxyethylene)-bis-acrylate, polytetrafluoroethylene, N,N'-ethylene-bis-tetrabromophthalimide.

The auxiliary agents may be used individually and/or as mixtures with other auxiliary agents of the same class and/or belonging to different classes as defined above.

The salts of the metals of the I and/or of the II A and B Groups of the Periodic Table of the elements of the said particular inorganic compounds are used, in the absence of auxiliary agents, in an amount equal to or lower than 3 phr and preferably at levels in the overall equal to or lower than 0.6 phr (moreover, when two or more salts mixed with each other are used, the respective amounts may be further decreased), whilst in the presence of auxiliary agents they are used in an amount equal to or lower than 2 phr, and preferably at levels in the overall equal to or lower than 0.4 phr.

The individual auxiliary agents or their mixtures are used in an amount equal to or lower than 3 phr and preferably in an amount in the overall equal to or lower than 0.8 phr.

The addition of such additives is efficacious with any types of aromatic polycarbonates with viscosimetric average molecular weight comprised within the range of from 10,000 to 100,000; preferably of from 20,000 to 50,000, and in particular with the polycarbonates as prepared by means of the reaction of an aromatic diol, e.g., bisphenol A [2,2-bis-(4-hydroxyphenyl)-propane] with a precursor of carbonate group. The preparation of polycarbonates by means of the known interface polycondensation technique is usually carried out in the presence of a molecular weight adjuster, of an acid-acceptor, and of a catalyst.

The precursor of the carbonate group generally used is carbonyl chloride, but other halogenides, haloformates or esters of carbonic acid may be used as well in processes carried out in the absence of solvent. As the bisphenol, in addition to the bisphenol A, there may be used: bis-(hydroxyphenyl)-alkanes, such as bis-(4-hydroxyphenylmethane, 2,2-bis-(4-hydroxy-3-methylphenyl)-propane, hydroquinone, resorcinol, bis-(4-hydroxyphenyl)-p-diisopropyl-benzene.

Polyfunctional aromatic compounds, with at least three functional groups may be used to yield branched polycarbonates.

It is of course possible to use two or more bis-phenols. The several products being the object of the present invention can be used as flame retardants not only for the straight polycarbonate, but also for the branched one, for mixtures thereof, or for polycarbonate-containing polymeric alloys. The polycarbonate may moreover contain also other additives such as pigments, thermo-oxidation stabilizers, lubricants, dyestuffs, fillers, U.V. radiation absorbers and so forth.

All the operating details shall be clear from the reading of the following Examples, whose only purpose is of illustrating the invention without limiting its scopes.

EXAMPLES 1-61

100 Parts of aromatic polycarbonate prepared by means of the reaction of bisphenol A and phosgene are mixed with the additives and the auxiliary agents as reported in Table 1.

The mixture of additives and polycarbonate, previously homogenized by milling in a Retsch mill, is introduced into an extruder heated at about 260° C. and the extrudate is subsequently cooled and granulated.

The granules have been moulded both by compression moulding (285° C., 40 kg/cm²), and by injection moulding at about 300° C., to obtain different types of specimens: specimen A (about 127×12.7×3.2−1.6 mm), specimen B (about 127×6.5×3.2 mm) and specimen C (about 65×55×3.2 mm).

The A specimens, five for each formulation reported in Table 1, are submitted to the fire-performance test for the rating of the materials according to the UL-94 Standard of "Underwriters Laboratories". According to this procedure, the materials are respectively rated as V-0, V-1, V-2 on the basis of the results of the five specimens and according to the following criteria:

94 V-0: No one specimen must show a combustion time longer than 10 seconds after the removal of the Bunsen burner's flame. The total combustion time for the five specimens (ten ignitions) must not exceed 50 seconds. No one specimen must make burning particles drip, igniting the surgical cotton placed along the vertical beneath the specimen at the distance of 305 mm.

94 V-1: No one specimen must show a combustion time longer than 30 seconds after the removal of the flame of Bunsen burner. The total combustion time for the five specimens (ten ignitions) must not exceed 250 seconds. No one specimen must let ignited particled drip, igniting the surgical cotton placed along the vertical beneath the specimen at the distance of 305 mm.

94 V-2: No one specimen must show a combustion time longer than 30 seconds after the removal of the flame of the Bunsen burner. The total combustion time for the five specimens (ten ignitions) must not exceed 250 seconds. The specimens may let ignited particles drip, igniting the surgical cotton placed along the vertical under the specimen at the distance of 305 mm.

Moreover, the five specimens must all pass the UL-94 test, otherwise they are rated on the basis of the worse specimen. As an example, if one specimen has a V-2 behaviour, and the other four specimens have a V-0 behaviour, all the five specimens receive a V-2 rating.

If a specimen continues to burn for more than 30 seconds after the removal of the Bunsen burner flame, it cannot be rated under the UL-94 Standard, but it is reported, in the present invention, as a combustible polymer. The B specimens are submitted to the test for fire-performance, according to the ASTM D 2863-77 standard, which correlates the flammability of a polymeric material to the concentration of oxygen in the atmosphere under which the sample is. This correlation is expressed as LOI (Limiting Oxygen Index), i.e., the lowest oxygen percentage capable of supporting the combustion of the specimen under a nitrogen-oxygen atmosphere impinging upon the same specimen from down upwards. The C specimens have been used for measurings of light transmission by using an XL211 Gardner instrument. To the purpose of better illustrating the present invention, in Table 1 the results are reported of measurements carried out on virgin polycarbonate, indicated as the reference polymer, and on polycarbonate after the addition of the salts of inorganic compounds and possibly in combination with the auxiliary agents, which are the object of the present invention.

TABLE 1

| Example | FR Additive (phr) | Auxiliary Agent (phr) |
|---|---|---|
| (Clear Polycarbonate) | | |
| R | Reference (Polycarbonate with no additive) | |
| 1 | Potassium Bromide (0.1) | |
| 2 | Potassium fluorosulphonate (0.1) | |
| 3 | Potassium chlorosulphonate (0.2) | |
| 4 | Calcium chlorosulphonate (0.2) | |
| 5 | Zinc chlorosulphonate (0.2) | |
| 6 | Potassium bromate (0.1) | |
| 7 | Potassium bromate (0.25) | |
| 8 | Sodium bromate (0.3) | |
| 9 | Potassium iodate (0.1) | |
| 10 | Potassium nitrate (0.1) | |
| 11 | Potassium nitrate (0.3) | |
| 12 | Sodium nitrate (0.3) | |
| 13 | Potassium cyanate (0.05) | |
| 14 | Potassium thiocyanate (0.01) | |
| 15 | Potassium thiocyanate (0.03) | |
| 16 | Sodium thiocyanate (0.025) | |
| 17 | Potassium ferrocyanide (0.1) | |

TABLE 1-continued

| | | |
|---|---|---|
| 18 | Potassium bromate (0.15) + potassium fluorosulphonate (0.02) | |
| 19 | Potassium bromate (0.15) + potassium thiocyanate (0.01) | |
| 20 | Potassium nitrate (0.15) + potassium thiocyanate (0.01) | |
| 21 | Potassium ferrocyanide (0.03) + potassium bromate (0.01) | |
| 22 | Potassium ferrocyanide (0.03) + potassium thiocyanate (0.01) | |
| 23 | Potassium ferrocyanide (0.02) + EDTA potassium salt (0.01) | |
| 24 | | Decabromodiphenyloxide (0.8) |
| 25 | Potassium bromide (0.3) | Decabromodiphenyloxide (0.3) |
| 26 | Potassium fluorosulphonate (0.04) | |
| 27 | Potassium fluorosulphonate (0.04) | Decabromodiphenyloxide (0.1) |
| 28 | Potassium fluorosulphonate (0.04) | Oligomer from phosgene and tetrabromo-bisphenol A (0.1) |
| 29 | Potassium chlorosulphonate (0.2) | |
| 30 | Potassium chlorosulphonate (0.2) | Decabromo diphenyloxide (0.2) |
| 31 | Calcium chlorosulphonate (0.2) | |
| 32 | Calcium chlorosulphonate (0.2) | Decabromo diphenyloxide (0.3) |
| 33 | Zinc chlorosulphonate (0.2) | |
| 34 | Zinc chlorosulphonate (0.2) | Decabromodiphenyloxide (0.3) |
| 35 | Potassium bromate (0.04) | |
| 36 | Potassium bromate (0.04) | Decabromodiphenyloxide (0.35) |
| 37 | Potassium bromate (0.07) | Octabromodiphenyloxide (0.1) |
| 38 | Potassium bromate (0.07) | 1,2-bis-(2,4,6-tribromophenoxy)-ethane (0.1) |
| 39 | Sodium bromate (0.1) | Decabromodiphenyloxide (0.1) |
| 40 | Potassium iodate (0.07) | Decabromodiphenyloxide (0.1) |
| 41 | Potassium nitrate (0.025) | |
| 42 | Potassium nitrate (0.025 | Decabromodiphenyloxide (0.3) |
| 43 | Potassium nitrate (0.07) | Octabromodiphenyloxide (0.1) |
| 44 | Potassium nitrate (0.07) | Tetrabromobisphenol A - bis-(2,3-dibromo-propylether) (0.1) |
| 45 | Potassium cyanate (0.035) | |
| 46 | Potassium cyanate (0.035) | Decabromodiphenyloxide (0.1) |
| 47 | Potassium thiocyanate (0.01) | |
| 48 | Potassium thiocyanate (0.01) | Brominated polyphenyleneoxide (0.1) (Br = about 67%) |
| 49 | Potassium thiocyanate (0.01) | Tetrabromobisphenol A - bis(2-hydroxyethyl) - bisacrylate (0.15) |
| 50 | Sodium thiocyanate (0.025) | |
| 51 | Sodium thiocyanate (0.025) | Oligomer from phosgene and tetrabromo-bisphenol A (*) (0.1) |
| 52 | Potassium ferrocyanide (0.04) | |
| 53 | Potassium ferrocyanide (0.04) | Decabromodiphenyloxide (0.1) |
| 54 | Potassium ferrocyanide (0.02) + potassium nitrate (0.01) | Decabromodiphenyloxide (0.1) |
| 55 | Potassium ferrocyanide (0.02) + sodium thiocyanate (0.01) | Decabromodiphenyloxide (0.1) |
| Opaque Polycarbonate | | |
| 56 | Potassium bromate (0.15) | N,N'—ethylenebistetrabromophthalimide (0.7) + polytetrafluoroethylene (0.1) |
| 57 | Potassium nitrate (0.15) | Decabromo diphenyloxide (0.7) + polytetra fluoroethylene (0.1) |
| 58 | EDTA sodium and calcium salt (0.15) | Brominated polyphenyleneoxide (0.8) (Br = about 67%) |
| 59 | Potassium thiocyanate (0.01) + EDTA sodium and calcium salt (0.15) | Brominated polyphenyleneoxide (0.8) (Br = about 67%) |
| 60 | Potassium ferrocyanide (0.05) + potassium thiocyanate (0.015) | N,N'—ethylenebistetrabromophthalimide (0.5) |
| 61 | Potassium ferrocyanide (0.05) + potassium thiocyanate (0.015) | N,N'—ethylenebistetrabromophthalimide (0.5) |

NOTE:
The samples nos. 56, 57 and 60 contain black pigment; the samples nos. 58, 59 and 61 contain red pigment.

(*) 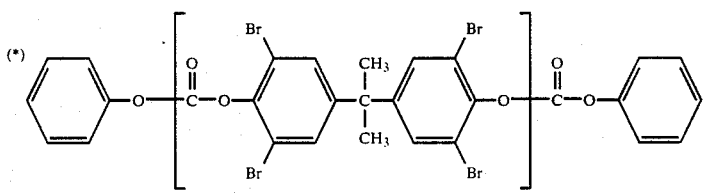

| Total combustion time of 5 specimens (10 ignitions), seconds | Max. combustion time per specimen (2 ignitions), seconds | Number of burning drops per 5 specimens igniting the cotton | UL-94 rating (3.2 mm) | LOI % | MFI (300° C.; 1.2 kg) (g/10') | Transmitted light, % |
|---|---|---|---|---|---|---|
| 263 | 77 | 8 | BURNS | 26 | 5.5 | 88.9 |

TABLE 1-continued

| | | | | | | |
|---|---|---|---|---|---|---|
| 98 | 26 | 4 | V-2 | 31 | 5.6 | 87.7 |
| 39 | 9 | 0 | V-0 | 34 | 6.0 | 87.5 |
| 107 | 25 | 2 | V-2 | 30 | 6.2 | 85.7 |
| 134 | 29 | 5 | V-2 | 30 | 6.1 | — |
| 92 | 28 | 5 | V-2 | 30 | 6.0 | — |
| 76 | 23 | 1 | V-2 | 32 | 5.7 | 87.3 |
| 31 | 9 | 0 | V-0 | 35 | 5.9 | 86.2 |
| 37 | 10 | 0 | V-0 | 34 | 6.0 | 84.0 |
| 61 | 20 | 0 | V-1 | 34 | 5.6 | 86.9 |
| 70 | 24 | 0 | V-1 | 32 | 6.0 | 85.7 |
| 36 | 10 | 0 | V-0 | 33 | 6.3 | — |
| 68 | 20 | 0 | V-1 | 32 | 6.5 | — |
| 54 | 16 | 0 | V-1 | 33 | 5.9 | 87.8 |
| 67 | 16 | 3 | V-2 | 30 | 5.9 | 88.4 |
| 30 | 9 | 0 | V-0 | 35 | 6.6 | 88.0 |
| 51 | 17 | 0 | V-1 | 33 | 6.2 | 88.1 |
| 38 | 9 | 0 | V-0 | 34 | 6.1 | — |
| 39 | 10 | 0 | V-0 | 35 | 5.9 | 87.0 |
| 40 | 9 | 0 | V-0 | 34 | 6.1 | 87.1 |
| 36 | 8 | 0 | V-0 | 34 | 6.2 | 85.8 |
| 26 | 7 | 0 | V-0 | 35 | 5.8 | 86.0 |
| 27 | 8 | 0 | V-0 | 36 | 6.1 | 86.3 |
| 41 | 10 | 0 | V-0 | 33 | 6.2 | 87.6 |
| 263 | 77 | 8 | BURNS | 26 | 5.5 | 88.9 |
| 86 | 20 | 5 | V-2 | 30 | 5.6 | 88.5 |
| 73 | 21 | 0 | V-1 | 32 | 5.6 | 86.1 |
| 75 | 23 | 2 | V-2 | 30 | 5.7 | 88.3 |
| 40 | 10 | 0 | V-0 | 37 | 5.7 | 88.0 |
| 36 | 9 | 0 | V-0 | 36 | 5.7 | 88.2 |
| 107 | 25 | 2 | V-2 | 30 | 6.2 | 85.7 |
| 68 | 23 | 0 | V-1 | 32 | 6.2 | 85.1 |
| 134 | 29 | 5 | V-2 | 30 | 6.1 | — |
| 87 | 20 | 0 | V-1 | 34 | 6.0 | — |
| 92 | 28 | 5 | V-2 | 30 | 6.0 | — |
| 68 | 17 | 0 | V-1 | 33 | 6.1 | — |
| 95 | 26 | 3 | V-2 | 32 | 5.5 | 87.4 |
| 40 | 10 | 0 | V-0 | 33 | 5.6 | 87.0 |
| 39 | 10 | 0 | V-0 | 36 | 5.7 | 87.0 |
| 36 | 9 | 0 | V-0 | 35 | 5.6 | 87.1 |
| 41 | 9 | 0 | V-0 | 33 | 5.9 | 86.6 |
| 39 | 10 | 0 | V-0 | 36 | 5.6 | 87.8 |
| 102 | 25 | 2 | V-2 | 30 | 5.8 | 87.3 |
| 35 | 9 | 0 | V-0 | 34 | 5.9 | 87.0 |
| 27 | 9 | 0 | V-0 | 36 | 6.1 | 86.4 |
| 41 | 10 | 0 | V-0 | 36 | 6.1 | 86.1 |
| 63 | 16 | 1 | V-2 | 32 | 5.9 | 87.8 |
| 24 | 7 | 0 | V-0 | 35 | 6.0 | 87.5 |
| 67 | 16 | 3 | V-2 | 30 | 5.9 | 88.4 |
| 33 | 8 | 0 | V-0 | 35 | 5.9 | 86.1 |
| 29 | 7 | 0 | V-0 | 35 | 6.0 | 88.2 |
| 51 | 17 | 0 | V-1 | 33 | 6.2 | 88.0 |
| 35 | 9 | 0 | V-0 | 36 | 6.2 | 88.0 |
| 82 | 19 | 0 | V-1 | 33 | 5.7 | 87.1 |
| 18 | 5 | 0 | V-0 | 37 | 5.7 | 87.0 |
| 33 | 8 | 0 | V-0 | 36 | 5.6 | 87.2 |
| 26 | 6 | 0 | V-0 | 36 | 5.6 | 87.5 |
| 62 | 16 | 8 | V-2 | 27 | 5.1 | |
| 21 | 5 | 0 | V-0 | 40 | 5.6 | |
| 17 | 4 | 0 | V-0 | 39 | 6.1 | |
| 54 | 16 | 0 | V-1 | 37 | 5.8 | |
| 27 | 9 | 0 | V-0 | 38 | 5.8 | |
| 19 | 7 | 0 | V-0 | 37 | 5.9 | |
| 30 | 8 | 0 | V-0 | 37 | 6.1 | |

I claim:

1. A self-extinguishing polycarbonate composition which comprises:
   (a) a polycarbonate;
   (b) an effective amount of potassium ferrocyanide or potassium thiocyanate and
   (c) N,N'-ethylenebis-tetrabromophthalimide.

2. A composition as defined in claim 1 wherein the polycarbonate is derived from bisphenol-A and a carbonate precursor.

3. A composition as defined in claim 2 which comprises:
   (a) a polycarbonate;
   (b) from 0.6 to 3.0 phr of potassium ferrocyanide or potassium thiocyanate; and
   (c) from 0.8 to 3.0 phr of N,N'-ethylenebis-tetrabromophthalimide.

4. A composition as defined in claim 3 which includes polytetrafluoroethylene as part of component (c).

5. A composition as defined in claim 1 wherein component (b) is potassium thiocyanate.

6. A composition as defined in claim 1 wherein component (b) is potassium ferrocyanide.

7. A self extinguishing polycarbonate composition which consists essentially of:
   (a) a polycarbonate resin derived from bisphenol-A and carbonyl dichloride;
   (b) from 0.6–3 phr of potassium ferrocyanide or potassium thiocyanate; and
   (c) from 0.8 to 3.0 phr of N,N'-ethylenebis-tetrabromophthalamide.

* * * * *